United States Patent [19]

Savary et al.

[11] Patent Number: 5,315,584
[45] Date of Patent: May 24, 1994

[54] SYSTEM OF DATA TRANSMISSION BY SHARING IN THE TIME-FREQUENCY SPACE WITH CHANNEL ORGANIZATION

[75] Inventors: Jean-Yves Savary, Cesson Sevigne; Floriane Blusseau, Thorigne Fouillard, both of France

[73] Assignee: France Telecom and Telediffusion de France, France

[21] Appl. No.: 808,676

[22] Filed: Dec. 17, 1991

[30] Foreign Application Priority Data

Dec. 19, 1990 [FR] France .................. 90 16383

[51] Int. Cl.$^5$ .................................. H04J 11/00
[52] U.S. Cl. ............................. 370/18; 370/21; 370/50; 370/69.1
[58] Field of Search ............... 370/50, 70, 60, 94.1, 370/18, 21, 69.1; 375/38, 58, 40; 455/54.1, 59, 50.1; 371/43, 44; 381/13, 14; 358/12, 142, 143

[56] References Cited

U.S. PATENT DOCUMENTS

| | | | |
|---|---|---|---|
| 3,988,545 | 10/1976 | Kuemmerle et al. | 370/60 |
| 4,881,241 | 11/1989 | Pommier et al. | 455/59 |
| 4,922,483 | 5/1990 | Kobayashi | 370/50 |

FOREIGN PATENT DOCUMENTS 0369917 5/1990 European Pat. Off.

OTHER PUBLICATIONS

"Principles of Modulation and Channel Coding for Digital Broadcasting for Mobile Receivers," EBU Technical-Review, Aug. 1987, vol. 224, pp. 168-189.

Aikoh and Kanemasa, "A New TDM Technique for Voice, Data and Video Transmission," Globe Com, 1987, Tokyo, 15-18 Nov., 1987, vol. 2.

Takiyasu and Tanaka, "Consideration of a Slot Access Method for Backbone Local Area Networks," Computer Networks and ISDN Systems, vol. 17, No. 3, Sep. 15, 1989, pp. 193-199.

Listani, Pacifici, Roveri and Winkler, "INFONET: A Broadband Integrated Service Local Area Network," Globalcom, 1987, Tokyo, 15-18 Nov., 1987, vol. 2.

Primary Examiner—Douglas W. Olms
Assistant Examiner—Dang Ton
Attorney, Agent, or Firm—Locke Reynolds Boyd & Weisell

[57] ABSTRACT

A system for the transmission of digital data elements corresponding to at least one application each comprising at least one stream of data elements, the data elements being constituted by digital elements distributed in the time-frequency space and transmitted in the form of symbols constituted by a multiplex of orthogonal carrier frequencies modulated by a set of the digital elements and broadcast simultaneously, the symbols being organized in successive frames, each frame being organized in at least one data conveying channel, each channel being constituted by a succession of at least one consecutive symbol. The data elements may advantageously be transmitted, in each channel, either in transparent mode or in packet mode.

20 Claims, 3 Drawing Sheets

SYSTEM OF DATA TRANSMISSION BY SHARING IN THE TIME-FREQUENCY SPACE WITH CHANNEL ORGANIZATION

BACKGROUND OF THE INVENTION

1. Field of the Invention

The field of the invention is that of digital data broadcasting, notably according to methods that provide for time and frequency interleaving of the data.

Such methods are being developed notably for high quality sound broadcasting applications, especially broadcasting to moving bodies in urban environments, but also to fixed receivers. These applications are often designated by the term DAB (Digital Audio Broadcasting).

The invention can also be applied advantageously in the field of digital television such as for example the DNT (diffusion numérique de terre or earth digital broadcasting) project.

The invention can be applied in particular, but not exclusively, to the broadcasting system known as the COFDM (Coding Orthogonal Frequency Division Multiplex) system as described in the U.S. Pat. No. 4,884,139 published on Nov. 28, 1990.

2. Description of the Prior Art

As a rule, the broadcasting of signals, whether radio or television (analog or digital) signals relies, according to known techniques, on the association of a transmission channel with a specific program. This association is fixed and permanent.

In other words, at present, each television or each radio station is systematically associated with a fixed transmission frequency.

If digital broadcasting is analyzed from the viewpoint of the ISO reference model, the applications, and for example the high quality sound application, correspond to the Presentation layer (layer 6) and Application layer (layer 7). Seen from the other end of the ISO model, the transmission part DAB corresponds to the functions of the Physical layer (layer 1) and the Link layer (layer 2).

It is seen, therefore, that the intermediate layers are not represented. At present, applications and network are closely related. In other words, there is no intermediate protocol that can be used, when possible, to decorrelate an application from the network. While this absence can, in certain cases, facilitate the processing operations, it most usually amounts to a severe handicap.

Furthermore, the extension of this system of broadcasting to other fields of application such as, for example, the broadcasting of personal messages, driving assistance messages, localization messages, television signals etc. proves to be difficult.

The object of the invention notably is to overcome the drawbacks of the prior art.

SUMMARY OF THE INVENTION

More precisely, an aim of the invention is to provide a system for the broadcasting of digital data in which the transmitted data elements are organized so that it is possible to distinguish among data elements belonging to several distinct applications.

In particular, it is an aim of the invention to provide a system such as this, enabling the simultaneous broadcasting of data of any type, namely audio, video, computer communications or other data.

Another aim of the invention is to provide a system such as this, having greater robustness than known systems.

The invention is also aimed at providing a system such as this, wherein the transmission resource can be reconfigured for each type of application. The invention is aimed in particular at optimizing the management of the overall transmission resource.

A further aim of the invention is to provide a system such as this enabling a partial demodulation of the multiplex at reception, so as to simplify the receivers and hence reduce their cost.

These aims, as well as others that shell appear here below, are achieved according to the invention by means of a system for the transmission of digital data elements corresponding to at least one application each comprising at least one stream of data elements, said data elements being constituted by digital elements distributed in the time-frequency space and transmitted in the form of symbols constituted by a multiplex of orthogonal carrier frequencies modulated by a set of said digital elements and broadcast simultaneously, the symbols being organized in successive frames, wherein each frame is systematically partitioned into capacity units for the conveying of data elements of identical size, one conveying capacity unit being constituted by at least one consecutive symbol portion, and then structured or organized into at least one data conveying channel, each channel being constituted by a succession of at least one data conveying capacity unit, and wherein at least some frames include one information element that is descriptive of its channel organization, this organization being capable of being dynamically reconfigured.

Thus, according to the invention, one and the same transmission channel can be assigned to the conveyance of data elements corresponding to distinct programs and applications. Data, sound and images can cohabit without difficulty.

Since the organization of the frame can be reconfigured dynamically, it can be done optimally, according to the needs, at each instant, of the different applications.

In other words, the invention enables the decorrelation of Application and Presentation layers from the Physical and Link Layers if reference is made to the ISO reference model.

It must be noted that this approach to digital broadcasting through the ISO model, which is used essentially to facilitate the invention, does not have any obvious basis.

For, this model is specifically dedicated to data processing and to local networks. There is no obvious basis for its application to digital broadcasting, and there are no reasons for such an application. On the contrary, for those skilled in the art, there is always a direct and unilateral link between the information to be transmitted and its physical carrier.

Thus invention provides an original solution to a new problem, which has never been raised, namely that of the decorrelation of the network and application layers in the field of digital broadcasting.

This approach is particularly advantageous. It provides, notably, great flexibility in the use of the network, an optimizing of the resource as a function of needs, the possibility of transmitting different types of signals (images, sounds, data etc.).

This new flexibility leads to a dynamic definition of the allocation of the overall resource and to the continuous transmission of a description of the transmission channel.

Preferably, the information describing the organization of the train of symbols in channels is conveyed in a specific symbol and/or in a specific signalling channel.

Said information describing the organization of the train of symbols in channels is preferably transmitted in the current frame and/or in at least one of the preceding frames, cyclically.

In a preferred embodiment, said capacity units are constituted by an integer number of symbols. For example, a capacity unit may correspond to a symbol.

However, it is clear that any other level of capacity unit, i.e. elementary breakdown of the frame, could be chosen. Thus, for example, it is possible to provide for capacity units corresponding to 1.5 symbols, or to any other value.

Advantageously, each channel is allocated to the transmission of an integer number of streams belonging to a same application.

The term "application" is understood to mean a set of information. It contains one or more streams (audio, video, data, etc.). An application is also a program or a service.

This organization in streams makes it possible notably to simplify the decoding of the signals. Indeed, for example, sound signals may correspond to a first stream and image signals to a second stream. At reception, these two types of signals are easily distinguished and directed towards the appropriate decoders.

In an advantageous embodiment, said system includes means to format the data corresponding to at least one of said channels in packet mode.

It is known that transmission by packets is particularly advantageous, as regards both the optimizing of the bit rate and transmission security.

Preferably, in this case, said packets have a fixed size chosen from at least one available packet size.

Depending on need, the number of channels using packets may be variable. In particular, it is quite possible that no channel will use the packet mode. In other words, the possibility of implementing the packet mode in no way dictates the minimum number of channels to be transmitted according to this mode.

In a particular embodiment of the invention, one and the same frame may therefore contain at least one channel in packet mode and at least one channel in transparent mode.

Advantageously, the packets are synchronous with each successive symbol of said channel. Thus, when decoding, it is easy to recover the packets and to detect packet losses if any, for these loses are always located in the same place in each capacity unit.

In order to preserve this synchronization, it is necessary to fill up said packets and said channels by padding.

Advantageously, said signalling signal and/or said signalling channel contain at least one information element belonging to the group comprising:
markers of the beginning and end of said channels;
the operating mode used for each channel;
relationships among the channels;
the identification of the applications.

In a preferred embodiment of the invention, each of the packets has a header including at least one information element belonging to the group comprising:
an application identifier;
a stream identifier;
a media type of information element;
an information element on the type of length of packet;
an information element identifying the first packet of a stream;
an information element identifying the last packet of a stream;
a packet number;
a protection information element;
an information element on the length of useful data.

BRIEF DESCRIPTION OF THE DRAWINGS

Other features and advantages of the invention shall appear from the following description of a preferred mode of the invention, given as a non-restrictive illustration, and from the appended drawings, of which.

DETAILED DESCRIPTION OF THE INVENTION

The invention therefore relates to the broadcasting of data elements interleaved in time and frequency, notably according to the COFDM system.

This system of digital broadcasting is based on the joint use of a channel encoding device and a method of modulation by multiplexing of orthogonal frequencies.

The method of modulation proper of this known system makes it possible to overcome problems related to the frequency selectivity of the channel. It consists in providing for the distribution of the constituent digital elements of the data signal in the frequency-time space and in simultaneously transmitting sets of digital elements on N parallel broadcasting channels by means of a multiplex of frequencies using orthogonal carriers. In particular, this type of modulation makes it possible to prevent two successive elements of the data train from being transmitted at the same frequency.

The invention provides this system with the functions corresponding to the functions of the Network and Transport layers (3 and 4) of the ISO (*Interfonctionnement des Systemes Ouverts*=Opens Systems Interfunctioning) model. It may be recalled that the approach to broadcasting systems through this ISO model is quite novel and original. These novel functions give the transmission network the flexibility necessary to open it to novel applications and enable a more optimized and more flexible use of the overall transmission resource.

According to the invention, the organization of the transmission network relies on the existence of a service channel, the structuring of the transmission resource into channels and, possibly, the partitioning of certain data elements into packets.

More precisely, inside each channel, the data elements may be conveyed either in packet mode or in transparent mode.

In packet mode, in a channel, the elements of an application are identified by a same address. The links between the application and the address are specified in the service channel. Several applications may be multiplexed in one and the same channel. They then have different addresses.

By contrast, in transparent mode, a channel can naturally contain only one stream of a same application.

An application may be distributed over several channels. Certain channels may be used in packet mode, and others in transparent mode. The links among the application, the channels and the addresses are specified in the service channel.

In a known way, the network is formed by successive frames, for example according to the method described in U.S. Pat. No. 5,191,576.

Each frame is constituted by successive symbols, a symbol being a set of orthogonal carrier frequencies, each being modulated by one or more binary elements and being transmitted simultaneously.

These frames are constituted by capacity units consisting of one of more consecutive symbols or portions of consecutive symbols. These capacity units have a fixed format that is identical for all the units.

They may correspond to an integer number of symbols, but this is in no way obligatory. It is quite possible, depending on need, to choose any elementary granularity.

Subsequently, for reasons of simplification, we shall consider a particular case where one capacity unit corresponds to a symbol. Furthermore, the term "symbol" shall be used systematically instead of the term capacity unit. It is clear, however, that this particular case is not exhaustive.

According to the invention, the frames are then all subdivided into channels. A channel is therefore constituted by a sequence of one or more consecutive symbols, always located at the same location on all the frames. This structuring can be reconfigured according to need.

Figure 1:
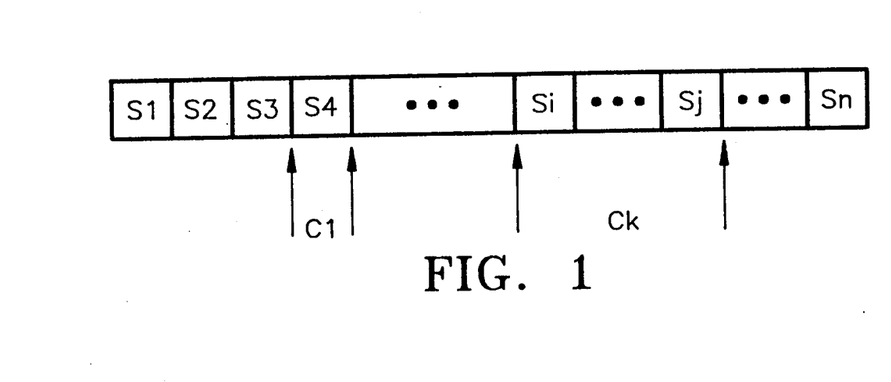
FIG. 1 shows a frame broadcast by a system according to the invention.

FIG. 1 is an example of a frame having an organization such as this, showing channels C constituted by an integer number of symbols S.

Each frame starts with three particular symbols, S1, S2 and S3, the role of which is specified hereinafter. It then includes a number of useful symbols from S4 to Sn.

The symbol S1 is a zero symbol making it possible, firstly, to carry out an analog synchronization and, secondly, to carry out the spectral analysis of the broadcasting channel. The symbol S2 is a second synchronization symbol constituted by a non-modulated multiplex of all the carrier frequencies, with substantially constant envelope. This enables the synchronization to be reset with greater precision through analysis of the pulse response of the channel. The role and the embodiment of these symbols S1 and S2 are described in the above-mentioned U.S. Pat. No. 5,191,576. Naturally, these synchronization symbols are not obligatory with respect to the invention. They are presented purely by way of an illustration.

The symbol S3 is, by contrast, an essential characteristic of the invention. For, this symbol is a service channel that indicates the organization and content of the network.

The allocation of the resource is done by assigning one or more channels to each application and by fixing the size (in number of symbols) of each of these channels.

This allocation of resources results, for example, from a convention established between the network operator and the program operator.

Thus, a first application that requires only one symbol is assigned the corresponding channel C1 in all the frames of the symbol S4. By contrast, for another application having a higher bit rate, the channel Ck corresponding to the consecutive symbols Si to Sj is defined.

The service symbol S3 is managed by the operator of the network. It gives the decoder the position of the channels in the frames, and the description of each application.

This service symbol S3 is decoded constantly, and the information elements that it contains preferably relate to a frame at a distance of n frames, so that the decoder can anticipate modifications if any.

Thus, when a change of structuring in the frame $X_t$ is planned, the service symbol S3 specifies the new structuring from the frame $X_{t-n}$ onwards.

The service symbol S3 may notably contain the following information elements:

the beginning and end markers of the channels (for example: channel Ck=[Si, Sj]) describing the static organization of the resource;

the operating mode used per channel (for example: channel Ck=transparent, packet);

relationships if any between the contents of different channels belonging to one and the same application;

the identification of the applications.

The operator of the network therefore defines the channels in a static way, and informs the service channel of these information elements. These markers may naturally be redefined by the operator in the event of need.

In this way, it is easy to optimize the use of the resource. Thus, for example, if we consider the case of a program of radiophonic broadcasting, it is possible for channels of variable sizes, depending on whether the sound is transmitted in stereophonic mode (for music) or in monophonic mode (for speech). It will be understood that this system offers great flexibility. When the operation is in monophonic mode, it is possible to recover the available space to create another channel, for example dedicated to the conveying of teletext and image information elements.

The relationship between the applications and the channels defined by the static organization of the resource is set up by means of a number of rules.

These rules are specified either directly in the service symbol S3 or in the specialized channels, specifying the links between the different information elements of a same program (according to a model similar to that of the directories of the data-processing archive systems). The latter approach offers greater flexibility.

In order to specify the working and use of the service symbol S3 with greater precision, a description is given here below of a particular example (which of course does not restrict the scope of the invention) designed for the broadcasting of a digital television signal towards moving bodies.

In this broadcasting method, each frame has a duration of 24 ms, and is constituted by 150 symbols.

In order to obtain the most efficient distribution of the overall transmission resource, this resource is therefore organized into channels of constituent elements, the dimensioning of a channel of constituent elements being a function of the needs of the application.

A channel is therefore formed by a sequence of one or more consecutive symbols. It will keep the same symbols from one frame to another so long as it has not been redefined.

Generally, at a given instant:
a symbol can be assigned only to a channel of constituent elements;
a channel is formed by at least one symbol;
a channel may include all the symbols not assigned to other channels.

The content of a channel of constituent elements is given by the program operator. This content is varied. In the case of the DNT project, the content may notably include:
DAB sound (mono, stereo),
MPEG video,
Secam quality video,
D2 MAC quality video,
HD MAC quality video.

Other contents naturally cannot be ruled out.

The data elements of the service channel are broadcast in the symbol S3. This symbol should be constantly decoded by the receivers.

In the case of a broadcasting network broadcasting towards moving bodies, the symbol S3 has, for example, a capacity of 112 bytes per frame.

In order to ensure a broadcasting error rate of the order of $10^{-12}$, the data elements of the service channel are protected by a Reed Solomon type corrector code (CSCR). For this, the corrector code uses 16 bytes.

After the error corrector code, there are therefore 96 useful bytes available in the service channel.

The data elements of the service channel are transmitted in blocks at a rate of one block per frame.

Figure 4:
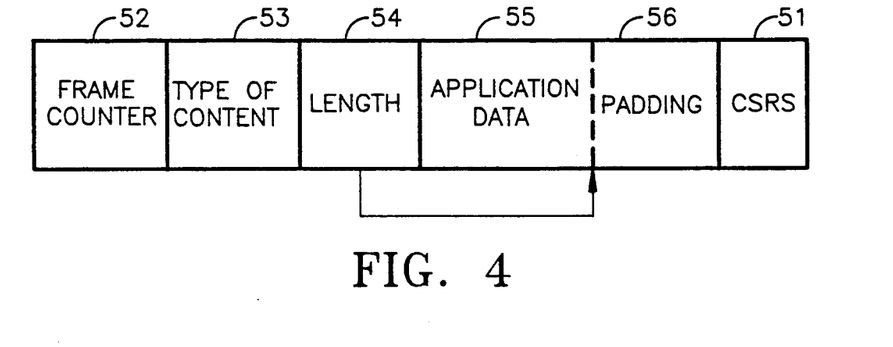
FIG. 4 shows the content of a service symbol.

A block such as this is illustrated in FIG. 4.

Each block ends with 16 error correction bytes (CSRS) 51.

Each block is constituted by a minimum header of 3 bytes:
Byte 1: the frame counter (52);
Byte 2: the type of content of the block (53);
Byte 3: the length of the data field (54).

The frame counter 52 enables the grouping together of, for example, 256 frames and the defining of even-parity and odd-parity superframes (also called phases). The duration of a superframe is equal to T=256*24 ms=6.144 s.

This counter make take values ranging from 0 to 255. It is incremented by one unit at each frame.

This information element can notably be used to define switching positions of the multiplex.

The type of content 53 defines the type of information that is conveyed in the service symbol S3 of the frame during processing. The contents may notably be:
a descriptor of the current multiplex of the channels of constituent elements (which should be conveyed at least twice per second, i.e. about once every 16 frames),
the service information elements (directory of services, nature of the programs being broadcast etc.),
descriptor of the future multiplex of the channels of constituent elements (should be conveyed at least twice per second or about once every 16 frames).

The length 54 of the data field 55 indicates the number of useful bytes in a block. The following bytes (if any) between the end of the useful bytes and the start of the CSRS 51 are padding bytes 56.

This parameter may assume values ranging from 0 to 93.

When this parameter assumes the value 0, it means that there is no useful data element in the block.

Figure 5:
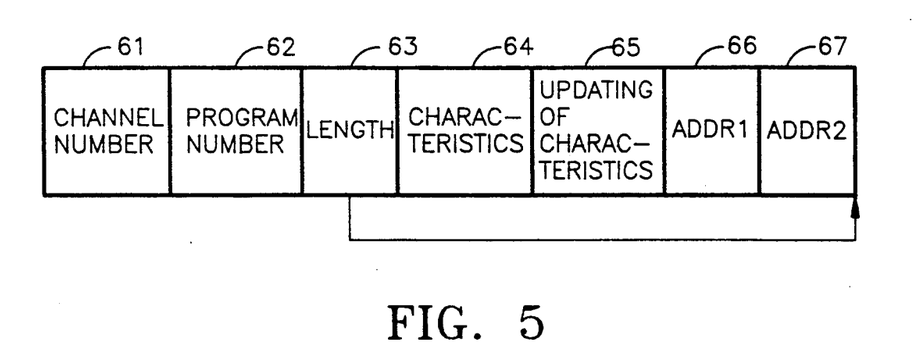
FIG. 5 shows a data field describing the organization of a channel.

The data field 55 may notably contain a descriptor of the current multiplex of the application channels, as illustrated in FIG. 5. This field of data indicates the current organization of the transmission channel. It gives a first level of information on the content of the application channels.

This descriptor notably contains:
a channel of constituent elements number 61 assigned to the channel of constituent elements. It is encoded on one byte and may assume any value between 1 and 254; the values 0 and 255 are reserved;
a program number 62. This reference is common to all the constituent elements of one and the same program. It is encoded on one byte and may assume any value between 1 and 254; the values 0 and 255 are reserved;
a useful length indication 63. This parameter gives an indication, in number of bytes, of the length of the field needed for the description of the applications channel and its content;
an indication on the characteristics of the constituent elements 64. This field gives the characteristics of the transmission mode and of the constituent elements transmitted: monophonic sound, stereophonic sound, MPEG video 1, SECAM quality video, D2MAC quality video, HDMAC quality video for example;
an indication 65 of forthcoming modification (updating) of the characteristics of the transmission mode and/or of the constituent elements transmitted: monophonic sound, stereophonic sound, changing of video type etc.;
two address parameters Addr1 66 and Addr2 67 indicating the symbols used by the application channel. To this end, Addr1 contains the number of the low signal and Addr2 contains the number of the high signal. The signals are numbered 4 to 149.

The data field 55 may also contain a descriptor of the future multiplex of the channels of constituent elements.

This data field indicates the future organization of the transmission channel. It gives a first level of information on the content of the application channels.

This field is used in the event of redefinition of the transmission allocation. It gives notice of a modification of the low and/or high boundaries of at least one application channel.

These information elements will be broadcast once every 16 frames, three or four times in the 48 or 64 frames that precede the switch-over.

It must be noted that since the system of the invention is a broadcasting system, the information elements describing the structure of the frame should be broadcast cyclically (for example twice every second). Thus, any receiver, irrespectively of the starting-up instant, may be operational.

The redefinition of the multiplex will take effect at the first passage of the frame: 63 to 64 or 127 to 128 or 191 to 192 or 255 to 0.

In this example, the service channel corresponds to a single symbol. It is clear, however, that if the number of service data elements is high, the service channel may be a channel formed by several symbols.

For each channel, two modes of operation are possible: a synchronous packet mode which enables an optimized use of the network, and the transparent mode.

The operation in transparent mode corresponds to the present working of the DAB. The data elements are transmitted directly on the transmission channel, without any addition of supplementary information. This means that one and only one stream of a single application can be associated with a channel. Thus, if this application is a single-stream application, then a channel will contain one and only one application.

This results in a possible under-utilization of the channel, since the space lost, if any, cannot be recovered. Should the needs of an application be smaller, it is not possible to allocate the remaining space to another application.

Furthermore, the transparent mode offers no open solution. It can be seen, therefore, that it is advantageous to add on a packet mode to this transparent mode, enabling the use of the channels to be optimized by its addressing mechanism.

In other embodiments, the channels may naturally be all transmitted in transparent mode, or all transmitted in packet mode.

In packet mode, the packets are advantageously synchronous with the symbols, so as to make it easier to identify the packet headers.

The synchronous mode means that the size of the packets used is fixed. However, this size may be chosen from among different packet sizes, so as to meet the requirements of applications with large and small volumes of data.

In this way, it is easy to identify a given packet in a frame. It is possible to work in real time and easily detect any missing packet.

This implies naturally that there is an integer number of packets per frame.

The structuring of the data elements in packets furthermore dictates the broadcasting of the padding packets if the entire channel is not allocated. These packets may be identified in a particular way to indicate that the packet does not contain useful data.

Should an application use only a part of the channel resource, it is clear that with a system for partitioning into packets such as this, it becomes possible to allocate the remaining part to another application.

This organization of the network is naturally specified in the service channel in order to enable easy access to the desired data elements.

At transmission, the data elements of the application are assembled in packets before being transmitted on the channel. Information elements placed in the header of the packets enable notably:
the association of a packet with an application;
the association of a packet with a data stream;
the detection of possible losses by the numbering of the packets.

At reception, the header information elements enable the data elements of one and the same application to be reassembled together.

The maximum size of the packets is equal to the maximum number of useful bits per symbol. Several packet sizes may be defined on the basis of this maximum size, for example in dividing this maximum size by $2^n$.

Figure 2:
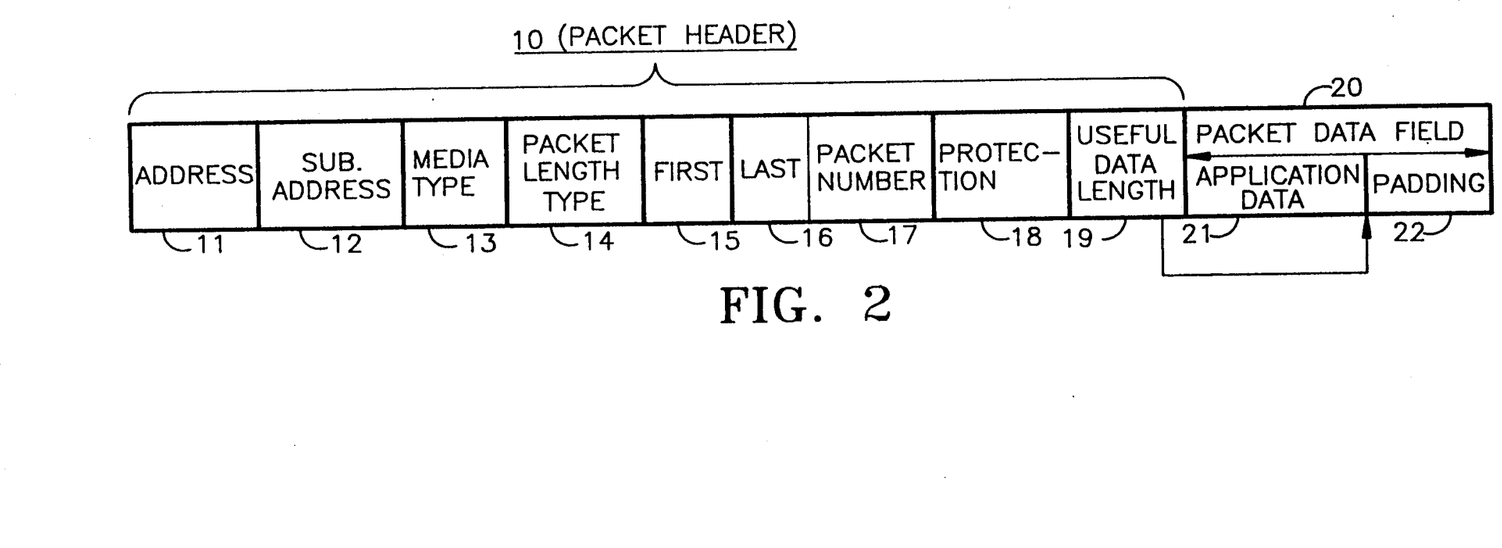
FIG. 2 shows the structure of a packet according to the invention.

The packet header 10 shown in FIG. 2 contains the following data elements on five bytes:
Parameters identifying a packet:
   an application identifier 11 (address);
   a stream identifier 12 proper to an application, in sub-address form (the streams of one and the same application will have the same address and distinct sub-addresses).
Parameters linked to the pair (address 11, sub-address 12):
   a media (audio, video, etc.) type 13 to facilitate the decoding;
   a packet length type 14, giving the length of the chosen packet;
   a Boolean value 15 indicating the first packet of the stream;
   a Boolean value 16 indicating the last packet of the stream;
a packet number (17) modulo 64 (index of continuity)
a protection parameter 18 with two information elements: a repetition information element on one bit (value 0: first packet transmission, value 1: repetition) and a protection indicator (value 0: no protection; value 1: protected data);
the effective length 19 of the data in bytes.

The data elements 20 of the packet include:
the effective data elements 21 of the application;
padding octets 22 if necessary (to fill up the packet).

The identification of each of the constituent streams of an application and the partitioning of these streams into packets with numbering enabling a multiplexing of the data elements of an application.

The numerical values given are of course purely indicative. Similarly, it is clear that parameters could be eliminated, added or modified without going beyond the field of protection of the invention.

Figure 3:
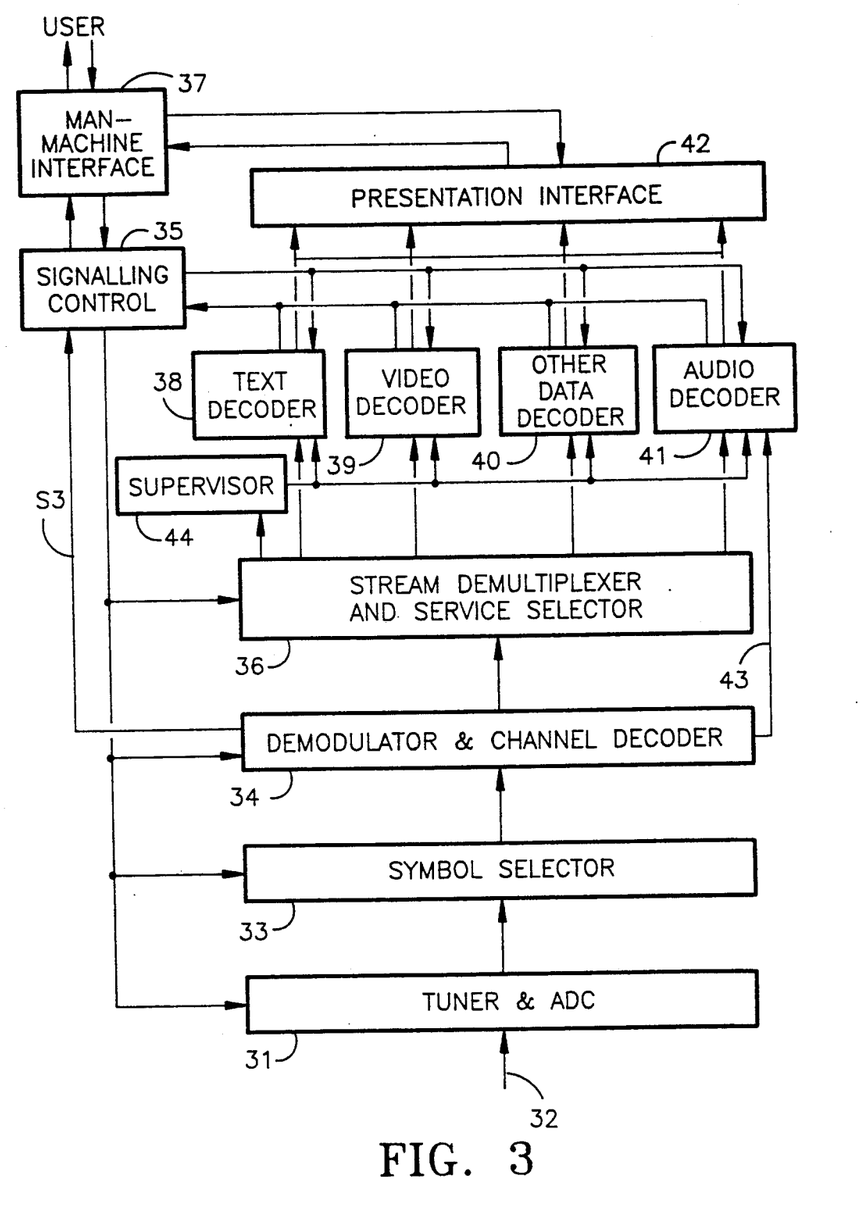
FIG. 3 is a block diagram of a receiver of data transmitted by the system of the invention.

FIG. 3 is a block diagram of a multimedia receiver compatible with the broadcasting system of the invention. A receiver such as this may, for example, enable the restitution of audio, video, teletext and other signals.

This receiver includes firstly a module 31 for the reception of the broadcast signal 32 and for analog-digital conversion, and a symbol selection module 33.

Owing to the structuring of the channels, the receiver selects the symbols constituting the channels corresponding to the desired program. The other signals are ignored and, in particular, are not demodulated. This partial demodulation gives a gain in processing time (notably for Viterbi decoding) and hence enables the making of less costly receivers.

The selected symbols are then demodulated and decoded in the module 34. At this level, the service channel S3 is recovered and directed towards a module 35 for the supervision of the signalling, that notably manages the modules 31, 33, 34, 36 and the different decoders, as a function of the user's requests, emitted by a man/machine interface module 37.

When the operation is in packet mode, the demodulated channel is transmitted to a module 36 for the demultiplexing of the streams and packets. This demultiplexing module 36 provides for the sharing of the different streams among the different decoders and comprises, for example, a teletext decoder 38, a video decoder 39, a decoder 40 for other types of data, and an audio decoder 41.

A sharing module 43 routes the data towards the decoders concerned.

The decoded data elements are transmitted to a restitution module 42 comprising, for example, a display screen and at least one loudspeaker.

It is also provided, in the embodiment, that the audio data elements may be transmitted in transparent mode. In this case, the data elements 43 are directed towards the decoder 41 directly after the demodulation and the decoding of the channel in the module 34.

What is claimed is:
1. A method of broadcasting a plurality of programs, each program comprising at least one stream of digital information, each stream of digital information having a throughput rate which can vary with time, the method comprising the steps of     organizing the streams of digital information into a succession of frames composed of a predetermined number of symbols,     arranging each frame as a plurality of data conveying channels, each channel comprising at least one symbol and containing digital elements from only one of said streams of digital information,     modifying the number of symbols in each channel in response to variations in said throughput rate of each stream of digital information,     periodically encoding in at least one selected symbol in at least some of the frames at least one information element descriptive of the organization of the channels, and     simultaneously transmitting the digital elements of each symbol on a multiplex of orthogonal carrier frequencies.

2. A method according to claim 1 further comprising the step of allocating to each data conveying channel the transmission of an integer number of said streams of data belonging to a same program.

3. A method according to claim 1 further comprising the step of formatting the data corresponding to at least one of said channels in data packets, each of said data packets comprising a header including information identifying a particular program and a data field including digital elements from said particular program.

4. A method according to claim 3, wherein said formatting step includes choosing the size of the packets from a set of predetermined available packet sizes.

5. A method according to claim 3, including the step of synchronizing said packets with each successive symbol of said channel.

6. A method according to claim 5 further comprising the step of filling the data field of said packets with nonsignificant padding data, when the packets are not completely filled with digital elements from one of the streams of digital information.

7. A method according to claim 1, wherein said step of periodically encoding said at least one information element includes at least one step belonging to the group comprising:

marking the beginning and end of said data conveying channels;

identifying the operating mode used for each data conveying channel;

relating the relationships among the data conveying channels; and     identifying the program in each channel.

8. A method according to claim 3, wherein the step of formatting the data in data packets includes at least one step belonging to the group comprising:

adding a program identifier;

adding a stream identifier;

adding a media type information element;

adding a length of packet information element;

adding an information element identifying the first packet of a stream;

adding an information element identifying the last packet of a stream;

adding a packet number;

adding a protection information element;

adding an information element on the length of useful data.

9. A method of claim 1 further comprising the step of changing the periodically encoded information element in anticipation of a change in channel organization of the frame.

10. A method according to claim 1 wherein said step of periodically encoding the at least one information element occurs at least twice per second.

11. A method according to claim 1 wherein said step of periodically encoding the at least one information element occurs about once every 16 frames.

12. A method according to claim 1 further comprising the step of grouping together groups of successive frames into superframes, and encoding a frame counter number in said selected symbol indicating the succession of the frames within the superframes.

13. A method according to claim 1 further comprising the step of adding to said selected symbol a corrector code to reduce broadcasting error.

14. A method according to claim 1 further comprising the step of filling up said data conveying channels with nonsignificative padding data, when the channels are not completely filled with digital data elements of a program.

15. A method of broadcasting a plurality of programs to any number of a group of receivers, each program comprising at least one stream of digital information, each stream of digital information having a throughout rate which can vary with time, the broadcasting method comprising the steps of     organizing the streams of digital information into a succession of frames composed of a predetermined number of symbols,     arranging each frame as a plurality of data conveying channels, each channel comprising at least one symbol and containing digital elements from only one of said streams of digital information,     modifying the number of symbols in each channel in response to variations in said throughout rate of each stream of digital information,     periodically encoding in at least one selected symbol in at least some of the frames an information element descriptive of the organization of the channels, and     simultaneously transmitting the digital elements of each symbol on a multiplex of orthogonal carrier frequencies, any of the group of receivers performing the steps of     detecting said information elements descriptive of the organization of the channels of the broadcast,     selecting the channels containing digital elements from a selected program, and     decoding the selected channels to reform the selected program.

16. A method of broadcasting a plurality of programs, each program comprising at least one stream of digital information, each stream of digital information having a throughput rate which can vary with time, the method comprising the steps of     organizing the streams of digital information into a succession of frames composed of a predetermined number of symbols,     arranging each frame as a plurality of data conveying channels, each channel comprising at least one symbol and containing digital elements from only one of said streams of digital information,     sensing the throughput rate of each stream of digital information, modifying the number of symbols in each channel in response to variations in said throughput rate of each stream of digital information, periodically encoding in at least one selected symbol in at least some of the frames at least one information element descriptive of the organization of the channels, providing a plurality of orthogonal frequency carriers at least equal to the number of digital elements in each symbol, modulating the plurality of orthogonal frequency carriers with the digital elements of each symbol, and simultaneously transmitting the digital elements of each symbol on a multiplex of the orthogonal carrier frequencies.

17. A method according to claim 16, wherein said step of periodically encoding said at least one information element includes at least one step belonging to the group comprising:

marking the beginning and end of said data conveying channels;

identifying the operating mode used for each data conveying channel;

relating the relationships among the data conveying channels; and identifying the program in each channel.

18. A method of claim 17 further comprising the step of changing the periodically encoded information element in anticipation of a change in channel organization of the frame.

19. A method according to claim 17 wherein said step of periodically encoding the at least one information element occurs at least twice per second.

20. A method according to claim 17 wherein said step of periodically encoding the at least one information element occurs about once every 16 frames.

* * * * *

UNITED STATES PATENT AND TRADEMARK OFFICE
CERTIFICATE OF CORRECTION

PATENT NO. : 5,315,584
DATED : May 24, 1994
INVENTOR(S) : Jean-Yves Savary and Floriane Blusseau

It is certified that error appears in the above-identified patent and that said Letters Patent is hereby corrected as shown below:

At column 11, line 37, please delete "5", and insert therefor --3--.

Signed and Sealed this

Sixteenth Day of August, 1994

Attest:

BRUCE LEHMAN

*Attesting Officer*     *Commissioner of Patents and Trademarks*